May 18, 1965 W. W. STEVENSON 3,183,712
FLOWMETER
Filed July 30, 1962 5 Sheets-Sheet 4

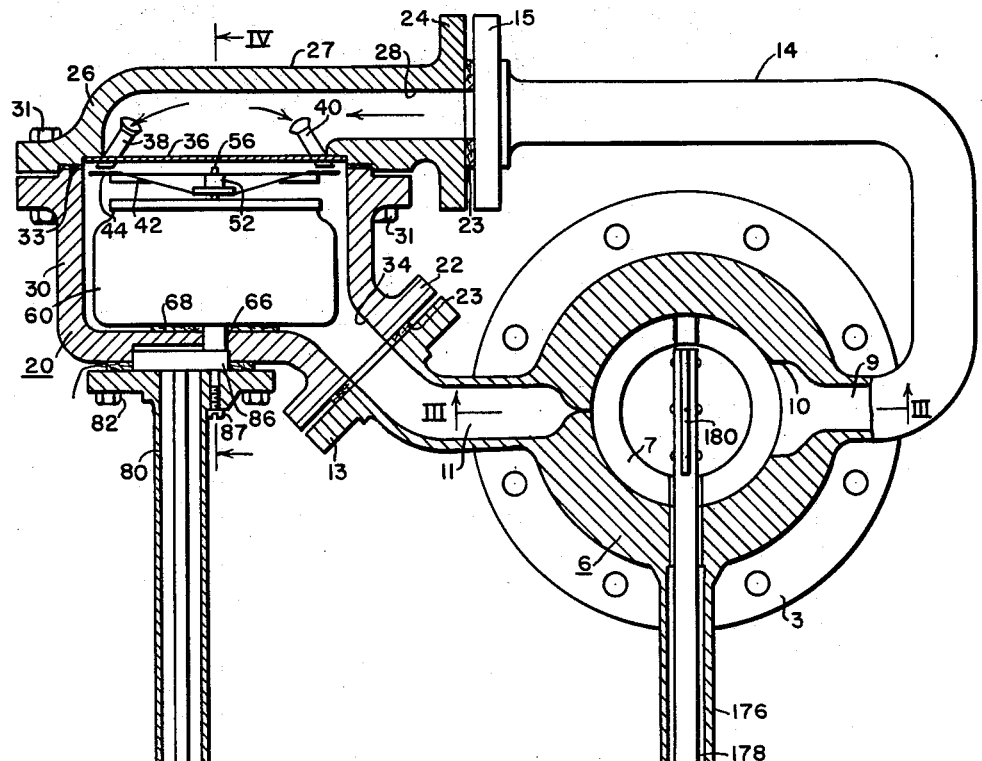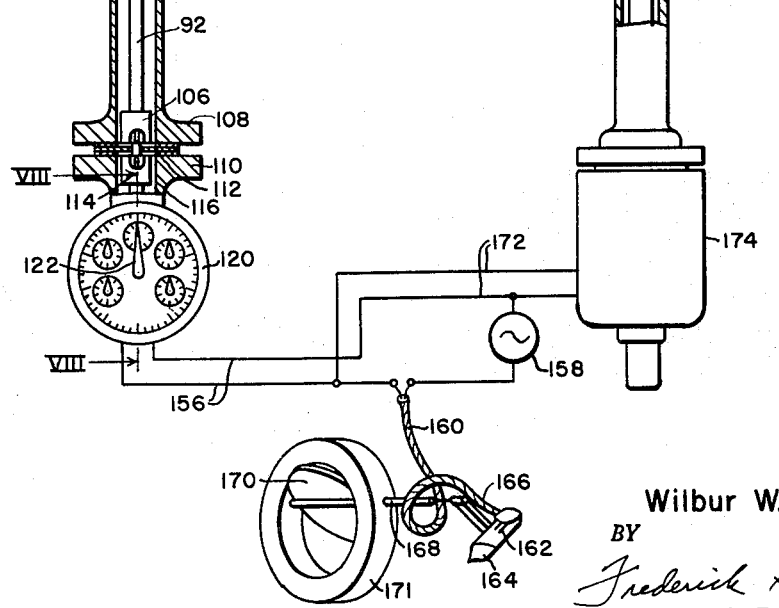
Fig. 1.
INVENTOR.
Wilbur W. Stevenson
BY Frederick Shopor
ATTORNEY May 18, 1965 W. W. STEVENSON 3,183,712
FLOWMETER
Filed July 30, 1962 5 Sheets-Sheet 3
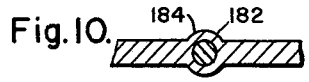
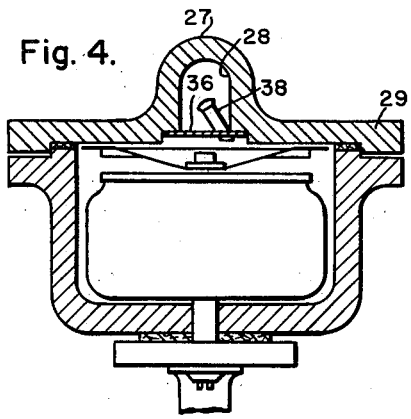
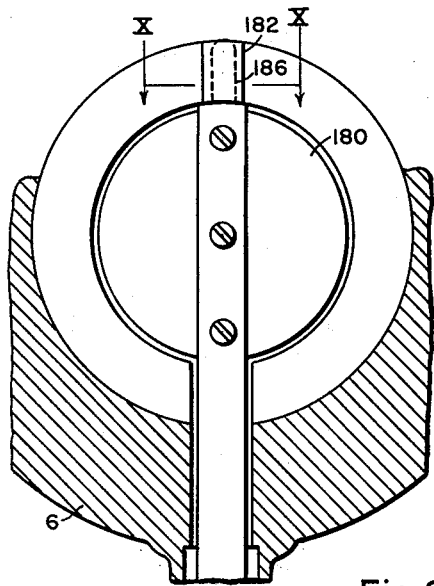
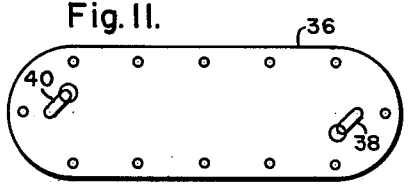
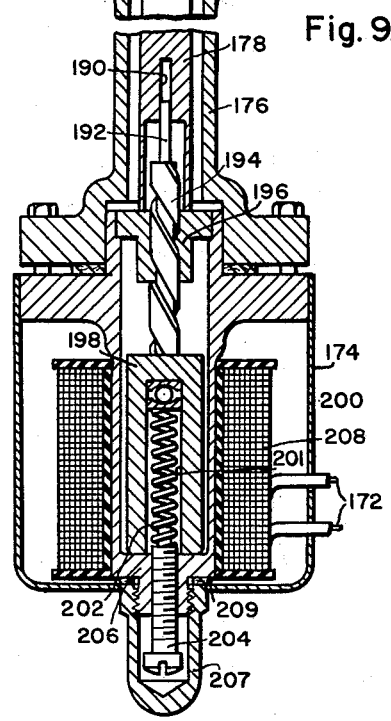
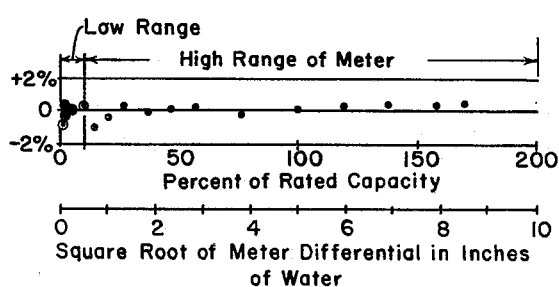

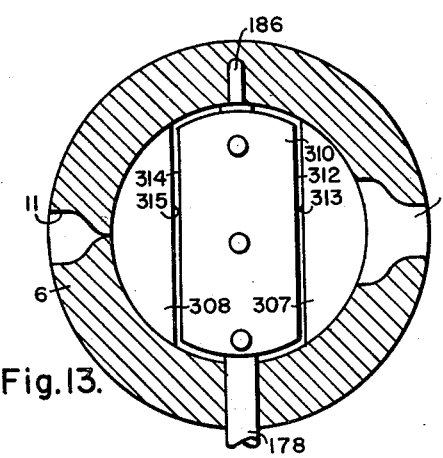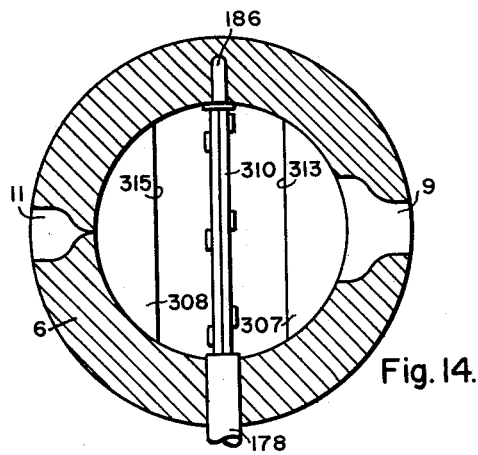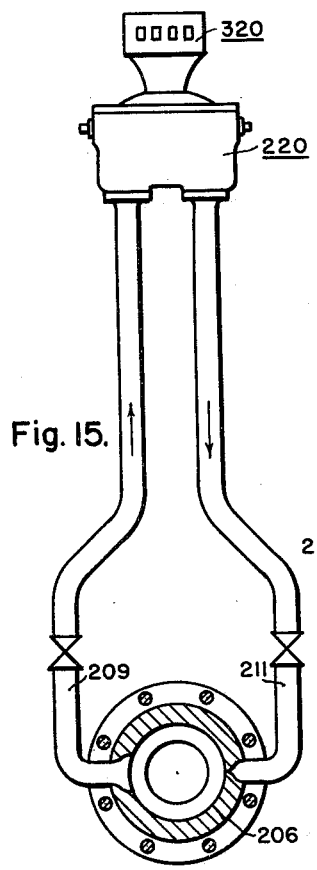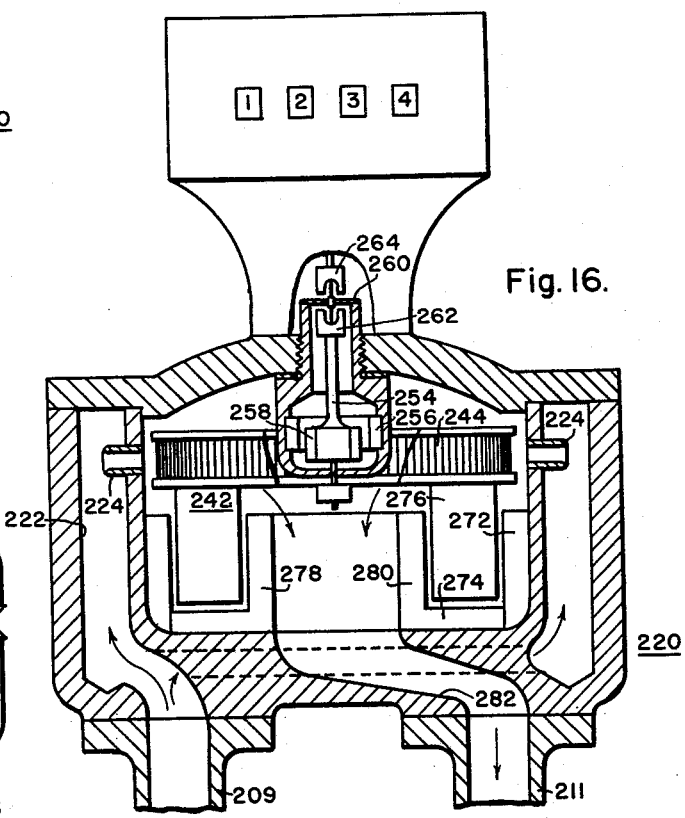

United States Patent Office 3,183,712
Patented May 18, 1965

3,183,712
FLOWMETER
Wilbur W. Stevenson, 1125 Lancaster, Pittsburgh 18, Pa.
Filed July 30, 1962, Ser. No. 213,192
14 Claims. (Cl. 73—203)

This invention relates to flowmeters for measuring accurately the amount of steam or other fluid passing through a conduit.

There is a need for a turbine rotor type of flowmeter that can be connected into a conduit so as to measure with a high degree of accuracy the quantity of steam, or other fluid, passing through the conduit over a wide range of flow rates. While known types of turbine rotor flowmeters are acceptably accurate within a fixed range of flow rates of steam, it is well known that beyond the upper limit and at the lower end of this limited range the accuracy drops off and becomes progressively poorer as the flow rate exceeds either of these limits. In some cases, the errors at the ends of the limits increase sharply so that substantial economic loss may be suffered since the payment for steam consumed is determined by the meter readings.

The errors in the prior art type of flowmeters have been determined as being based on the inability of the turbine rotor to revolve in direct proportion to the rate of steam flow in the conduit to which it is affixed. In particular, it has been found that the turbine rotors of prior art flowmeters by reason of their construction absorb a significant but variable proportion of the energy of a jet of steam derived from the conduit and consequently cannot respond with high sensitivity to the steam jet velocity which varies widely as the flow of steam in the conduit varies.

It is further desirable not only to provide a turbine rotor construction which is highly accurate over a wider range of steam flow than obtainable from prior art rotors, but also to compound the meter so that it measures flow accurately over a wide range of low flow rates of steam and then measures steam flow with equal accuracy over a contiguous adjacent region of higher flow rates. Such compounding means should be simple and reliable.

The object of this invention is to provide a novel turbine rotor for a flowmeter which will rotate with a high degree of accuracy over a wide range of conditions in accordance with the velocity of a fluid jet impinging thereon.

A further object of the invention is to provide a novel rotor for a turbine type flowmeter comprising arms of circular cylindrical sections to be impinged upon by jets whereby a high degree of accuracy in the meter is obtained.

A still further object of the invention is to provide a mechanism for shifting an orifice plate baffle from a full open to a restricted position and simultaneously changing the ratio of a register connected to the turbine wheel to compensate for the shifting of the orifice plate.

Another object of the invention is to provide in a flowmeter electrical means for shifting an orifice baffle plate in an orifice in a conduit from a full open to a closed position in accordance with rate of fluid flow in the conduit, and simultaneously changing the gear ratio in a transmission from a turbine rotor to a register in the meter.

A further object is to provide a flowmeter unit comprising an orifice plate having a butterfly valve baffle insertable in a conduit carrying a fluid to be measured, the baffle therein movable between a fully open and a flow restricting position in response to an electrical control means, a turbine rotor flowmeter operatively connected to the orifice plate whereby a small portion of the fluid in the conduit passes thereto to actuate the turbine rotor, the rotor being highly responsive to the portion of fluid impinging thereon and connected to an integrating register with electrically operated means to change the rates of turbine wheel turns to register in accordance with the butterfly valve baffle position.

Other objects of the invention will in part be obvious and will in part appear hereinafter. For a more detailed description of the invention reference should be had to the following detailed description and drawing wherein:

FIG. 1 is a vertical view, partly in section and partly schematically of the complete flowmeter apparatus connected into a conduit;

FIG. 4 is a fragmentary view partly in cross-section of the meter taken on line IV—IV of FIG. 1;

FIG. 9 is an enlarged vertical cross-section, partly broken, of the right hand portion of FIG. 1;

FIG. 10 is a fragmentary sectional view on line X—X of FIG. 9;

FIG. 11 is a top plan view of the nozzle plate;

FIG. 12 is a calibrated test curve of a meter constructed in accordance with the invention;

FIGS. 13 and FIG. 14 are schematic showings of a modified orifice baffle plate with a butterfly orifice baffle valve in fully closed and fully open position;

FIG. 15 is a vertical elevation of a modified form of meter, and

FIG. 16 is an enlarged view, partly in cross-section, of the upper portion of FIG. 15.

The present invention is directed to a novel wide range, highly accurate fluid meter system involving (1) an insert ring to be introduced into a conduit such as a pipe line conveying the fluid to be measured, the insert ring having an orifice and two small pipes which lead to the upstream and downstream faces of the orifice, (2) a novel fluid meter which is attached to and can be supported by the two small pipes, whereby the meter will operate in accordance with a quantity of the fluid conveyed to it through the two small pipes, (3) a flow sensing device in the pipe line responsive to the rate of fluid flow to assume an angular position responsive to the rate of such fluid flow, (4) an electrical switch operable by the flow sensing device, (5) a first electrical solenoid operable by the electrical switch to vary the orifice in the insert ring for high and low fluid flow rates and (6) a second electrical solenoid concurrently operable by the electrical switch along with the first solenoid to shift a register mechanism in the meter.

The meter system can be employed to measure flow rates of steam, air, nitrogen and other gaseous fluid or vapors, as well as liquids such as water.

Figure 3:
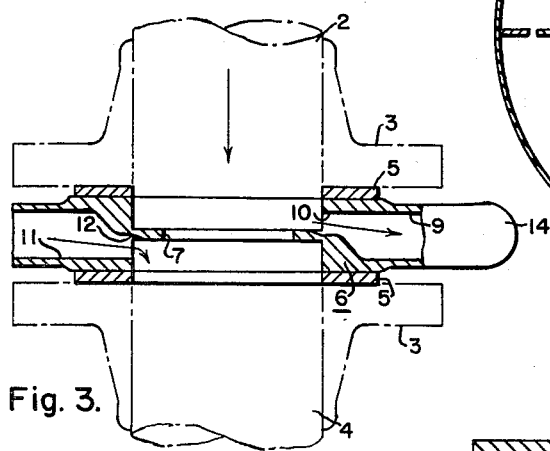
FIG. 3 is a fragmentary cross-section of the conduit taken on line III—III of FIG. 1.

Referring to FIGURE 1, there is illustrated, partly in cross-section and partly schematically, the novel flowmeter system of the present invention. An insert ring 6 is inserted in a pipe line conveying a fluid such as steam. As shown in more detail in FIGURE 3, the insert ring 6 is disposed between two flanged pipe sections 2 and 4 with flanges 3 and joined by bolts, not shown, into a fluid tight assembly with gaskets 5 between the flanges and the insert ring 6. An accurately machined orifice 7 is present in the insert ring. Fluid passing through pipe section 2 as indicated by the arrow in FIG. 3, builds up a higher pressure at the upstream face of the orifice 7 and a portion of the fluid is conveyed to the small pipe 9 from a relatively flat wide opening 10. At the downstream face of the orifice 7 a lower pressure develops and after passing through the meter, the fluid returns from the small pipe 11 to a wide opening 12 and thence to the pipe section 4. A differential pressure between lines 9 and 11 is present in proportion to the flow rate of the fluid pipe 2. Flanges 13 and 15 in the small pipes are positioned to receive and support the fluid meter proper 20 by means of mating flanges 22 and 24 and interposed gaskets 23 and bolts, not shown.

Insert rings similar to that shown may be provided for larger or smaller pipe lines with flanges 13 and 15 being spaced and positioned in the relationship shown so that the same meter can be employed universally for measuring flows in pipe lines of diameters as low as 1 inch to 14 inches, for instance.

Figure 2:
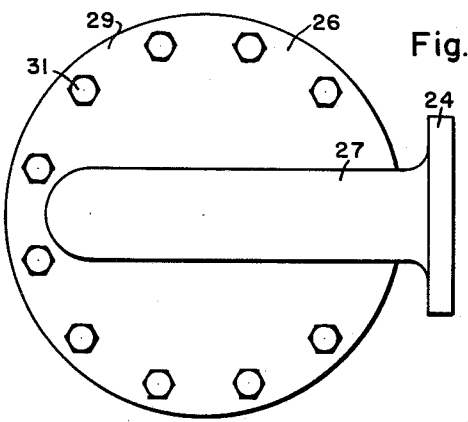
FIG. 2 is a top plan view of the flowmeter proper.

The meter 20, as shown in FIGS. 1 and 2, comprises an upper cover plate 26 which comprises a narrow elongated conduit 27 terminating in flange 24 and having a bore 28 for receiving fluid from small pipe 14. The remainder of cover plate 26 comprises a circular rim 29 through which bolts 31 pass and fasten it to a lower circular chamber 30 in fluid tight relation with interposed gasket 33. An exhaust bore 34 at the lower end of chamber 30 leads to small pipe 11.

As illustrated in FIGS. 1, 4 and 11, the bottom of the bore 28 in the upper cover plate 26 is closed by an elongated flat plate 36 inset in a recess 35 to effect a fluid tight seal. The flat plate 36 can be force fitted into the recess 35 or it can be fastened by machine screws against a gasket. The flat plate 36 is provided with two angularly disposed nozzles 38 and 40 to direct jets of fluid into the lower chamber 30 where they impinge on a rotor 42 to cause it to turn in direct proportion to the fluid passing thereon.

Figure 7:
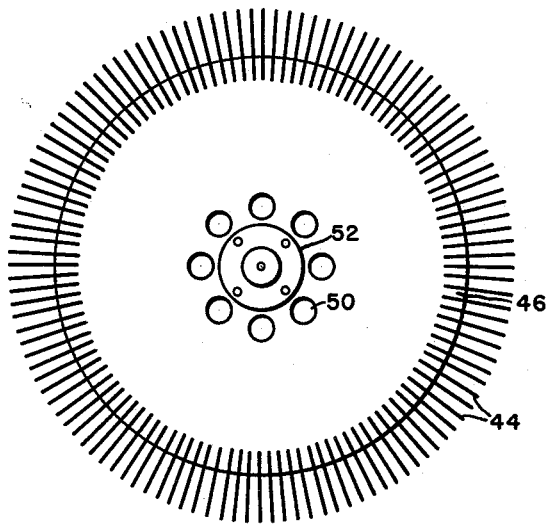
FIG. 7 is a plan view of the turbine rotor.
Figure 5:
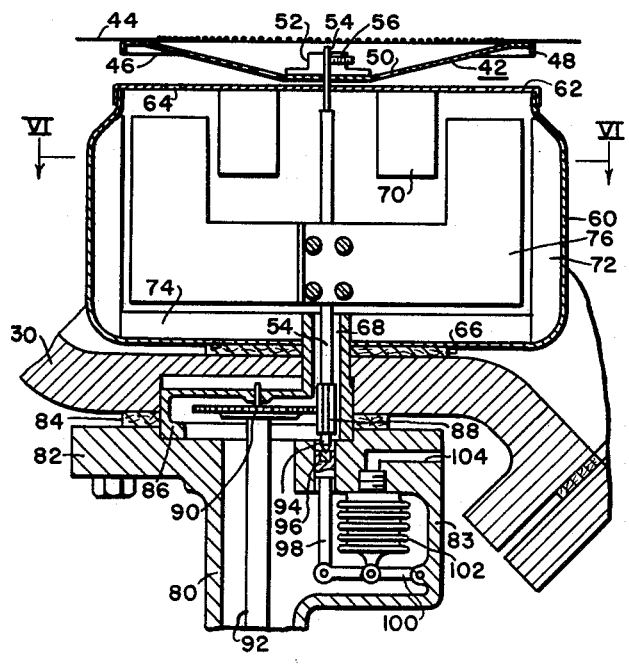
FIG. 5 is an enlarged vertical cross-section of a portion of the showing in FIG. 4, but at a right angle thereto.

Referring to FIGS. 1, 5 and 7, in particular, the rotor 42 comprises a peripheral series of radially positioned cylindrical pins 44 fixed, as by welding, to and extending beyond the rim of a concavely dished disk 46. The rim includes a stiffened flange 48. The center of the dished rim is provided with apertures 50 to permit liquid to drain out. A hub 52 affixed to the center of the rotor 42 is fastened to a shaft 54 by a set screw 56 in the hub.

It has been found that, contrary to the usual practice of using blades with airfoil or flattened surfaces, the cylindrical pins give the most accurate rotor response over an extremely wide range of fluid flows from the gate. The pins can be as small as a moderate sized sewing needle or as large as a small sized knitting needle. Pins of a range of diameters of from about 0.005 inch to 0.050 inch are usable with good results for many steam and gas meter applications. Stainless steel pins or rods are excellent for this purpose. These radially extending pins are non-clogging. Such a rotor construction results in the ability of the rotor to respond to the precise fluid velocity with a fidelity never before attained in fluid meters.

As shown in detail in FIG. 5, within the chamber 30 is a circular sheet metal casing 60 having a lower bulged portion provided with a firmly fixed flanged cover 62 having apertures 64 for free passage of liquid into and out of, the whole casing being mounted and non-rotatably on a hollow tubular projection 66 and resting on a resilient gasket 68.

The fitted cover 62, which is of smaller diameter than the bulging sides of casing 60 is provided with a series of downwardly extending baffle vanes 70, for example five being uniformly spaced. The bulging sides of casing 60 are provided with a series of fixed baffles 72, five in number for example, which preferably are offset angularly with respect to the baffle vanes 70, while a series of five baffles 74 are attached to the bottom of the casing, these latter baffles being angulary offset with respect to both vanes 70 and baffle 72.

Figure 6:
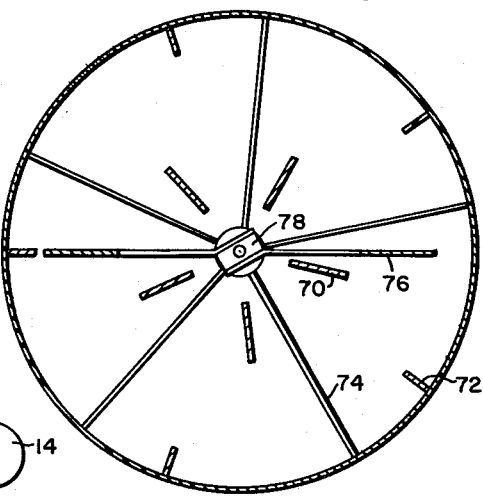
FIG. 6 is an enlarged sectional plan view taken on line VI—VI of FIG. 5.

The shaft 54 from rotor 42 passes through the vertical axis of casing 60 and carries two L-shaped movable damping vanes 76 fastened to a flat-surfaced hub 78 fixed to the shaft. The damper vanes 76, as will be evident from FIGS. 5 and 6, pass close to the vanes 70 and baffles 72 and 74. In operation the casing is filled with a damping fluid such as water, mercury or other liquid. In a single rotation of shaft 54, the vanes 76 pass at short angular intervals with respect to the successive fixed baffles and vanes. Accordingly a relatively smooth and uniform damping effect is obtained.

In the bottom of chamber 30 is the hollow tubular support 66 to which casing 60 is fixed with an interposed resilient gasket 68 disposed about the support 66 permitting casing 60 to rest thereon. Extending below chamber 30 is an elongated tubular sleeve 80 which is attached thereto by an upper flange 82, having an enlarged chamber 83, and a gasket 84. An enlarged portion 86 of the tubular support 66 is disposed within a recess in flange 82. As is evident from FIG. 5 in particular, the lower portion of rotor shaft 54 bearing an elongated pinion gear 88 passes through the hollow support 66 and engages with a gear 90 in the elongated portion 86, which gear is affixed to a shaft 92 extending the bottom of the tubular 80.

As illustrated in FIG. 5, the lower end of shaft 54 terminates in a conical pivot 94 supported on a floating bearing 96 borne by an arm 98 at the end of a pivoted lever 100 having one end 99 pivotally attached to the wall of the enlarged chamber 83. The lever 100 is connected at about its midpoint to the bottom of a bellows 102 whose interior is vented to the atmosphere through port 104, so that as the pressure in chamber 83 increases with respect to the atmosphere the bellows will compress thereby causing lever 100 to be moved upwardly thereby raising bearing 96 and the shaft 54 and baffle vanes 76 so that damping action on rotor 42 is reduced.

This self-adjusting bearing positioned in accordance with the pressure in chamber 30 and pipes 2 and 4, enables compensation for difference in pressures in the pipe so as to account for variations in density of a gas or steam being measured.

If desired, the conical pivot 94 of shaft 42 can be kept in position in a bearing which is only adjustable manually. In this event, the bearing 96 is supported by a threaded screw 87 as is shown in FIG. 1.

The lower end of tubular sleeve 80 terminates in a flange 108 which is fastened by bolts to a flange 110 of a register. Between flanges 108 and 110 is a gasket with a non-magnetic sealing cover plate 112, for example, a stainless steel plate. A permanent magnet 106 is attached to the lower end of shaft 92 and revolves a short distance above cover plate 112 in accordance with the motion of shaft 92. A second permanent magnet 114 is disposed on the lower side of cover plate 112 with its structure and poles so arranged that it will turn in accordance with the motion of magnet 106.

Figure 8:
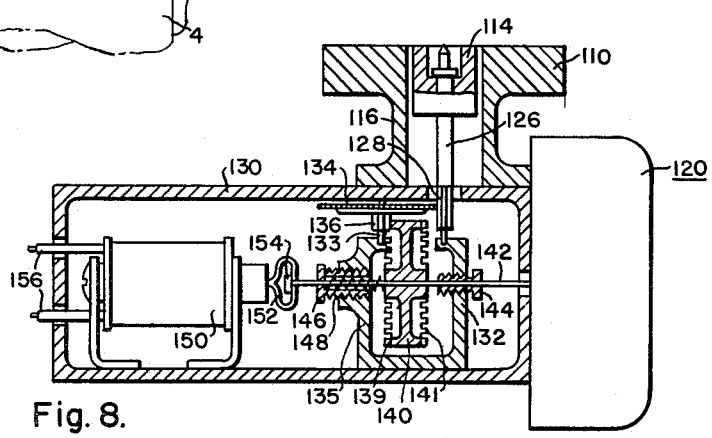
FIG. 8 is an enlarged sectional view in elevation taken on line VIII—VIII of FIG. 1.

As is shown in FIGS. 1 and 8, flange 110 is a part of a short hollow casing 116 within which permanent magnet 114 rotates and its revolutions are totalized in a register 120 having a dial 122. The register 120 is of known construction. However, mechanism for transmitting the rotations of magnet 114 under different measuring conditions in different ratios to the register are provided as is best seen in FIG. 8. A shaft 126 with a pinion gear 128 is fixed to magnet 114 and passes through an aperture in a casing 130 fixed to hollow casing 116 and has its lower end supported in a bearing on a bracket 132. A gear cluster unit 133 with a large gear 134 and a smaller gear 136 is supported from a bearing in a second bracket 135. The large gear 134 meshes at all times with pinion 128 while the smaller gear 136 meshes with the left hand gear 139 on unit 140 which also includes a right hand gear 141. The unit 140 is fixed to and rotates shaft 142 which is mounted for rotation and sliding motion in one bearing 144 threaded into bracket 132 and a second bearing 146 threaded into the bracket 135. The bearing 146 has a hollow within which a compression spring 148 is retained and tends to move the unit 140 to the right.

A solenoid coil 150 disposed in casing 130 has a plunger terminating in a loop 152 within which is engaged an enlarged bearing head 154 at end of shaft 142. When electrical current passes through leads 156 to solenoid 150, the plunger loop 152 pulls the head 154 of shaft 142 to the left against the force of spring 148 so that unit 140 is moved and gear 139 engages gear 136. When the solenoid is deenergized, the spring 148 pushes unit 140 to the right and gear 141 engages pinion 128 directly, thereby rotating unit 140 at a more rapid rate than when the solenoid is energized.

As will be evident from FIG. 1, electrical current from a source 158 is supplied to leads 156. One of the leads 156 is in circuit with electrical leads 160 connected to a mercury or other suitable switch 162 mounted on a bell arm 166 fixed for rotation with a shaft 168. The shaft 168 is attached to the baffle 170 at a point well above its center so that it tends to remain in closed position in a ring 171 located in a horizontal run of the pipe 4 preferably a slight distance away from the orifice. The baffle is mounted essentially on the shaft and may even be weighted at its lower end so that it requires a steam flow at a rate equal to 10% of its 100% capacity (nominally at 25 inches of water) to cause it to tilt to the open position. As the rate of flow of a fluid such as steam in the pipe 2 increases the pressure on the baffle 170 increases such that it is tilted counterclockwise and eventually attains a predetermined angle close to the horizontal position so that the mercury switch opens the contacts therein and the circuit 156 is broken. When the rate of flow of steam in the pipe 2 decreases the baffle 170 will drop and at a selected point the mercury switch will close the circuit to electrical leads 156 and thereby actuate the solenoid 150.

Current from leads 156 also passes through leads 172 to the orifice baffle operating mechanism 174. As is shown in FIGURES 9 and 10, mechanism 174 is attached to a hollow sleeve 176 depending from ring 6. Within sleeve 176 is a shaft 178 carrying an orifice baffle plate 180. The upper end 186 of shaft 178 is supported in a bearing 182 having a cylindrical bore 184. The lower end of shaft 178 is provided with a flat slot 190 within which fits a flat tang 192 of a spiral surfaced plunger 194. The plunger 194 passes through a mating spirally threaded nut so that as the plunger reciprocates it will turn. The plunger 194 is connected to a magnetic core member 198 which has an internal bore 201 with a ball bearing 200 acted upon by the upper end of a compression spring 202. The position of the lower end of spring 202 is adjustable by means of a threaded screw 204 passing through a solenoid casing 206 of solenoid 208. A cap 207 serves to maintain a seal about the lower end of the solenoid with the aid of gasket 209.

When electrical current passes into circuit 156 when mercury switch 162 closes, current also passes by means of leads 172 to solenoid 208 so that the core 198 is retracted downwardly against spring 202 and plunger 194 turns and thereby rotates shaft 178 and turns baffle 180 on shaft 178 to the position shown in the upper part of FIG. 9 so that it materially restricts steam flow through orifice 7. The condition of the baffle 180 is 90° from the position shown in FIG. 1.

In operation, as the rate of steam flow in pipe 2 increases to a point where switch 162 opens the circuit in line 156 and 172, the solenoid 208 is deenergized so that core 198 is no longer retained in its lowermost position but is caused to move upwardly under the influence of spring 202. In its upward motion the core causes spiral shaft 194 to turn and thereby turn shaft 178 by an angle of 90° so that the orifice baffle 180 assumes a position parallel to the flow of steam in pipe 2 as is shown in the upper part of FIG. 1, though the solenoid core in FIG. 9 illustration is shown retracted. This results in a large decrease of pressure at the orifice 7 so that there occurs a sudden drop in the pressure difference between pipes 9 and 11 which results in a greatly decreased rate of movement of rotor 42. This decrease in the rotor revolutions is far more accurately related to the actual rate of steam flow at high flow rates than is attained across the orifice 6 under the condition when baffle plate 180 restricts the opening. To compensate for this induced artificial decrease in revolutions of the rotor, the solenoid 150 is also deenergized and the spring 148 draws shaft 142 and gear unit 140 to the right of the position shown in FIG. 8 whereby the revolutions of shaft 126 are in effect multiplied through gear 128 engaging with gear 141 and thence to register 120.

FIG. 12 is a calibration test curve of a meter of this invention tested over an extremely wide range of steam flows. For test purposes, a difference of steam pressures amounting to 25 inches of water between pipes 9 and 11 is taken as 100% of the rated capacity of the meter. The square root of the differential pressure is in direct proportion to the flow rate of steam in the pipe line. It will be observed that the meter records steam flows to an accuracy of better than a plus or minus 2% error in a range of steam pressure differentials of from ¼ inch to 100 inches of water across an orifice. Over this range of differential pressures the orifice is in the open baffle position. As the flow rate drops, the meter is designed to shift at ¼ inch of water pressure differential to the closed orifice baffle position as shown in the upper part of FIG. 9, whereupon the meter improves in accuracy which it will maintain in measuring steam flows which in the open baffle position would be down to a differential pressure of 0.0025 inch of water. Thus the meter is within an accuracy of better than 2% over the range of from less than 1% to 200% capacity, which far exceeds the accuracy and range capabilities of any known steam meter.

As shown in FIGS. 13 and 14, a non-circular orifice may be present in the insert ring. Segments 307 and 308 are fixed and form an orifice in which is disposed a butterfly valve type of baffle valve 310 whose edges 312 and 314 approach within a spaced distance the chord lines 313 and 315 of the segments. The baffle valve 310 is mounted at its lower end on the rotatable shaft 178 while the upper end carries a pivot 186 which is free to rotate in a bearing in ring 6. As shown in FIG. 13, the butterfly baffle valve 310 is in its fully disclosed position and exerts a maximum of restriction to fluid flow since the fluid can only pass through the spaces between 312 and 313, and between 314 and 315, as well as the slight clearance about the arcuate periphery of the valve. In FIG. 14, the valve 310 is in the fully open position and exerts a minimum of restriction on fluid flow.

Referring to FIGS. 15 and 16, there is shown a modification in the meter with basically the same relation of the several components. The insert ring orifice 206 causes steam to flow into line 209 and exhausts into line 211, and in its travel the steam passes through the meter 220 where it operates register 320 to record the total amount passing in the pipe. Steam from line 209 enters a manifold where it is directed by nozzles 224 at an angle to impinge on rotor 242 which comprises a series of vertical cylindrical pins 244 having advantages similar to the radial rotor pins 44. The rotor 242 is suspended on shaft 254 which is magnetically suspended by the interaction of magnets 256 on the casing and magnets 258 on the shaft. The rotation of shaft 254 is transmitted through a non-magnetic sealing disk 260 through the action of permanent magnet 262 fastened on the shaft and magnet 264 attached to the register.

Baffle vanes 276 attached to the lower side of rotor 244 effect damping by reaction with baffles 272, 274 and 278. A cylindrical overflow pipe 280 allows water or other liquid to fill the baffle area up to its top, then the excess water flows down the steam return channel 282.

Tests of a meter similar to that in FIG. 13, using mercury as the damping fluid and air as the gas being measured, gave excellent results. The accuracy of the meter was within 2% within pressure differentials of from 1 to 100 inches of water.

The rotor comprising pins of substantially circular cross-section has distinct advantages over the ordinary rotor construction embodying blades of air foil or flat surface construction. The advantage is that the pins present the same surface configuration to a jet of steam regardless of the angle of the jet to the pins. Therefore, the force applied to the pins is more constant as compared to a flat surfaced blade where with changes in the angle of the jet to the flat surface the effected force on the blades varies widely. The round pins are more self-cleaning than other types of blades.

It will be understood that while the pins are preferably of circular cross-section, they may be of rounded polygonal cross-section, as for example, octagonal cross-section with the edges rounded.

It will be understood that the invention is described generally in order to set forth the principles thereof, and that various modifications can be made without departing from the invention.

I claim:

1. In a fluid meter for measuring accurately the flow of a fluid in a conduit, in combination, an orifice in the conduit, a first pipe at the upstream face of the orifice to convey a portion of the fluid to a meter and a second pipe at the downstream face of the orifice to return the portion of the fluid to the conduit, a differential pressure existing between the two pipes, the meter comprising a rotor having a plurality of substantially circular pins, nozzle means for directing the fluid from the first pipe against the circular pins to cause rotation of the rotor in proportion to the differential pressure of the fluid, and means actuated by the rotor for integrating the revolutions of the rotor.

2. In a fluid meter for measuring accurately the flow of a fluid in a conduit, in combination, an orifice in the conduit, a first pipe at the upstream face of the orifice to convey a portion of the fluid to a meter and a second pipe at the downstream face of the orifice to return the portion of the fluid to the conduit, a differential pressure existing between the two pipes, the meter comprising a rotor having a plurality of substantially circular pins, nozzle means for directing the fluid from the first pipe against the circular pins to cause rotation of the rotor in proportion to the differential pressure of the fluid, means actuated by the rotor for integrating the revolutions of the rotor, an even number of movable vanes attached to the rotor, an uneven number of a plurality of fixed vanes disposed closely adjacent to but spaced from the movable vanes, and means for holding a liquid about both the movable and fixed vanes whereby to dampen the motion of the rotor.

3. In a fluid meter system capable of measuring with high accuracy the flow of a fluid in a conduit, in combination, an orifice in the conduit, a first pipe to convey a portion of the fluid from the upstream face of the orifice to a meter, a second pipe to return the portion of the fluid from the meter to the downstream face of the orifice, there being developed a differential pressure between the two pipes, a turbine rotor in the meter actuated by the portion of the fluid delivered by the first pipe in proportion to said differential pressure, integrating register means operable by the rotor, the rotor being accurate within a given error over a fixed range of differential pressures due to fluid flow rates in the conduit and diminishing in accuracy at a predetermined low differential pressure due to low fluid flow rates, butterfly baffle means in the orifice normally open at the fixed range of differential pressures, means for moving the butterfly baffle to a closed restricting position at low fluid flow rate in the conduit whereby a marked increase in differential pressure occurs at the orifice, whereby the rotor accurately revolves in accordance with the fluid portion conveyed thereto but at an increased rate, and means for coupling the rotor to the register so as to compensate for said increased rate whereby accurate metering is obtained both at high and low fluid flow rates in the conduit.

4. In a fluid meter system capable of measuring with high accuracy the flow of a fluid in a conduit, in combination, an orifice in the conduit, a first pipe to convey a portion of the fluid from the upstream face of the orifice to a meter, a second pipe to return the portion of the fluid from the meter to the downstream face of the orifice, there being developed a differential pressure between the two pipes, a turbine rotor in the meter actuated by the portion of the fluid delivered by the first pipe in proportion to said differential pressure, integrating register means operable by the rotor, the rotor being accurate within a given error over a fixed range of differential pressures due to fluid flow rates in the conduit and diminishing in accuracy at a predetermined low differential pressure due to low fluid flow rates, butterfly baffle means in the orifice normally open at the fixed range of differential pressures, means for moving the butterfly baffle to a closed restricting position at low fluid flow rate in the conduit whereby a marked increase in differential pressure occurs at the orifice, whereby the rotor accurately revolves in accordance with the fluid portion conveyed thereto but at an increased rate, means for coupling the rotor to the register so as to compensate for said increased rate whereby accurate metering is obtained both at high and low fluid flow rates in the conduit, the means for moving the butterfly baffle including an electrical switch responsive to fluid flow in the conduit, and an electrical rotor means coupled to the butterfly baffle and operable by the switch to turn the butterfly baffle at a predetermined fluid flow rate in the conduit from open to closed position or from closed to open position, and electrically operated gearing between the rotor and the register also actuated by the switch concurrently with the electric motor means to reduce or increase the effective rotor revolutions to the integrating register.

5. In a fluid meter system capable of measuring with high accuracy the flow of a fluid in a conduit, in combination, an orifice in the conduit, a first pipe to convey a portion of the fluid from the upstream face of the orifice to a meter, a second pipe to return the portion of the fluid from the meter to the downstream face of the orifice, there being developed a differential pressure between the two pipes, a turbine rotor in the meter actuated by the portion of the fluid delivered by the first pipe in proportion to said differential pressure, the rotor comprising a series of elongated pins of circular cross-section mounted at the periphery of the rotor, nozzle means disposed at an angle to the axis of rotation of the rotor to direct the portion of the fluid against the pins to cause the rotor to revolve, at least two damping vanes affixed to the rotor a plurality of stationary vanes disposed closely adjacent to the path of rotation of the damping vanes, a liquid surrounding the damping vanes and the stationary vanes so as to provide for damping the rotor, integrating register means operable by the rotor, the rotor being accurate within a given error over a fixed range of differential pressures due to fluid flow rates in the conduit and diminishing in accuracy at a predetermined low differential pressure due to low fluid flow rates, butterfly baffle means in the orifice normally open at the fixed range of differential pressures, means for moving the butterfly baffle to a closed restricting position at low fluid flow rate in the conduit whereby a marked increase in differential pressure occurs at the orifice, whereby the rotor accurately revolves in accordance with the fluid portion conveyed thereto but at an increased rate, and means for coupling the rotor to the register so as to compensate for said increased rate whereby accurate metering is obtained both at high and low fluid flow rates in the conduit.

6. In a fluid meter, a rotor adapted to be revolved by a jet of fluid, the rotor comprising a shaft, a plurality of pins of substantially circular cross-section attached to the shaft and extending in a substantially uniform pattern in a circle outwardly from the shaft at which the jet of fluid impinges on the pins to cause the rotor to revolve and means for directing a jet of fluid transverse of the length of the pins.

7. The rotor of claim 6 wherein the pins extend radially outwardly from the shaft.

8. The rotor of claim 6 wherein means are present to hold the pins in a circle about the shaft and the pins are parallel to the axis of the rotation of the shaft.

9. In a fluid meter for measuring the flow of a condensible vapor passing through a conduit, means for conveying a portion of the vapor from the conduit to drive a rotor therewith, an open top casing disposed within the meter immediately below the rotor, damping means attached to the rotor, the damping means comprising cooperating vanes and baffles disposed in the casing closely adjacent to the rotor whereby vapor condensate present in the vapor contacting the rotor drops into and fills the casing and cooperates with the vanes and baffles to effectuate damping of the rotor, vapor exhaust means adjacent the lower end of the casing, and the casing walls being partly spaced from the outer walls of the meter such that the vapors after driving the rotor pass about the walls of the casing on their passage to the vapor exhaust means to maintain its temperature.

10. In a fluid meter for measuring the flow of a vapor passing through a conduit, in combination, means for conveying a portion of the vapor to an enclosing casing having a rotor therein to drive the rotor thereby, damping means attached to the rotor, the damping means comprising cooperating vanes and baffles positioned with respect to each other such that shifting the relative positions of the vanes to the baffles varies the relative damping effect, and means responsive to the difference in pressure between that of the atmosphere and the vapor in the enclosing casing to shift the baffles with respect to the vanes.

11. In a fluid meter for measuring the flow of a gaseous fluid in a conduit, means for directing a portion of the gaseous fluid to an enclosing casing having a rotor therein to drive the rotor with said gaseous fluid, variable damping means cooperating with the rotor, means responsive to the difference between atmospheric pressure and the pressure of the gaseous fluid in the enclosing casing to change the variable damping means in accordance with the relative difference in said pressures.

12. In a fluid meter, means for directing a plurality of jets of fluid, each jet being directed in a given direction with respect to an axis, a rotor mounted for rotation on said axis, the rotor comprising a series of pins of rounded cross section disposed to be directly impinged by the plurality of jets of the fluid and driven thereby, the fluid clearing the pins after impingement and being exhausted away from the area of rotation of the pins whereby the pins are substantially self clearing, the pins presenting essentially the same configuration to each jet regardless of the angle of the jet to the pins.

13. In a fluid meter, means for directing a plurality of jets of fluid, each jet being directed in a given direction with respect to an axis, a rotor mounted for rotation on said axis, the rotor comprising a series of pins of rounded cross section and radially extending from the center of rotation of the shaft, the pins being disposed to be directly impinged by the plurality of jets of the fluid and driven thereby, the fluid clearing the pins after impingement and being exhausted away from the area of rotation of the pins whereby the pins are substantially self clearing, the pins presenting essentially the same configuration to each jet regardless of the angle of the jet to the pins.

14. An insert ring suitable for insertion in a conduit conveying a fluid in order to intercept and convey a portion of the fluid in the conduit to a flowmeter, comprising, in combination, a flat body with two faces to abut against flanges in the conduit, an orifice smaller than the conduit in the flat body, an aperture in the flat body at the upstream face of the orifice for conveying fluid to the flowmeter, a second aperture in the flat body at the downstream face of the orifice to return fluid from the meter, a flat orifice plate pivotally mounted in the orifice for movement to a closed position where it reduces the orifice opening to a small fraction as compared to the opening when the orifice plate is in an open position at right angles to the orifice, and means for moving the flat orifice plate from the open to the closed position.

References Cited by the Examiner

UNITED STATES PATENTS

| 842,947 | 2/07 | Desper | 73—197 |
| 1,108,721 | 8/14 | Dodge | 73—197 |
| 1,664,596 | 4/28 | Diehl | 73—203 |
| 1,963,904 | 6/34 | Hodgson | 73—230 |
| 2,099,139 | 11/37 | Neubling | 73—203 |
| 2,243,252 | 5/41 | Hunford et al. | 73—202 X |

FOREIGN PATENTS

| 4,228 | 12/74 | Great Britain. |
| 332,116 | 7/30 | Great Britain. |

OTHER REFERENCES

"Vortex Velocity Flowmeter," catalog sheet R–C–1, a publication of Rotron Controls Corp., Woodstock, N.Y., 73—229.

RICHARD C. QUEISSER, *Primary Examiner.*

EMIL G. ANDERSON, *Examiner.*